(12) United States Patent
Kweon et al.

(10) Patent No.: US 8,064,149 B2
(45) Date of Patent: Nov. 22, 2011

(54) FISHEYE LENS

(75) Inventors: Gyeongil Kweon, Gwangju (KR); Milton Laikin, Marina Del Rey, CA (US)

(73) Assignee: Nanophotonics Co., Ltd., Daejeon (KR)

( * ) Notice: Subject to any disclaimer, the term of this patent is extended or adjusted under 35 U.S.C. 154(b) by 13 days.

(21) Appl. No.: 12/810,655

(22) PCT Filed: Dec. 23, 2008

(86) PCT No.: PCT/KR2008/007606
§ 371 (c)(1),
(2), (4) Date: Jun. 25, 2010

(87) PCT Pub. No.: WO2009/084842
PCT Pub. Date: Jul. 9, 2009

(65) Prior Publication Data
US 2010/0277816 A1 Nov. 4, 2010

(30) Foreign Application Priority Data

Dec. 27, 2007 (KR) .................. 10-2007-0138415
Apr. 1, 2008 (KR) .................. 10-2008-0030184

(51) Int. Cl.
*G02B 9/64* (2006.01)
(52) U.S. Cl. ............................. 359/754; 359/755
(58) Field of Classification Search .......... 359/657, 359/725, 746, 754, 755
See application file for complete search history.

(56) References Cited

U.S. PATENT DOCUMENTS

| | | | |
|---|---|---|---|
| 2,947,219 A | 8/1960 | van Heel et al. | |
| 3,524,697 A | 8/1970 | Isshiki et al. | |
| 3,589,798 A | 6/1971 | Ogura | |
| 3,737,214 A | 6/1973 | Shimizu | |
| 5,502,592 A | 3/1996 | Jamieson | |
| 7,023,628 B1 | 4/2006 | Ning | |
| 7,283,312 B2 | 10/2007 | Kawada | |

FOREIGN PATENT DOCUMENTS

| | | |
|---|---|---|
| JP | 02-248910 A | 10/1990 |
| JP | 04-267212 A | 9/1992 |
| JP | 05-273459 A | 10/1993 |
| JP | 2002-072085 A | 3/2002 |
| JP | 2004-240023 A | 8/2004 |
| JP | 2006-098942 A | 4/2006 |
| JP | 2007-164079 A | 6/2007 |
| KR | 10-2008-0037530 B1 | 4/2008 |

OTHER PUBLICATIONS

K. Miyamoto, "Fish eye lens", J. Opt. Soc. Am., vol. 54, pp. 1060-1061 (1964).
R. Doshi, "Fisheye projection lens for large format film", Proc. SPIE, vol. 2000, pp. 53-61 (1993).
J. B. Caldwell, "Fast IR fisheye lens with hyper-hemispherical field of view", Optics & Photonics News, p. 47 (Jul. 1999).
J. J. Kumler and M. Bauer, "Fisheye lens designs and their relative performance", Proc. SPIE, vol. 4093, pp. 360-369 (2000).
International Search Report mailed on Jun. 22, 2009 in International Application No. PCT/KR2008/007606.

*Primary Examiner* — Darryl J Collins

(57) ABSTRACT

Disclosed is a fisheye lens comprised of the first through the seventh lens elements: wherein a field of view is larger than 180° a calibrated distortion is 10% or less, a relative illumination is 80% or more, all the refractive surfaces of the lens elements are spherical surfaces, the first lens element is a negative meniscus lens element having a convex surface facing an object side, the second lens element is a bi-concave lens element, the third lens element is a positive meniscus lens element having a convex surface facing an image side, a stop is located between the third and the fourth lens elements, the fourth lens element is a bi-convex lens element, the fifth lens element is a bi-concave lens element, the sixth and the seventh lens elements are bi-convex lens elements.

6 Claims, 5 Drawing Sheets

[Fig. 1]
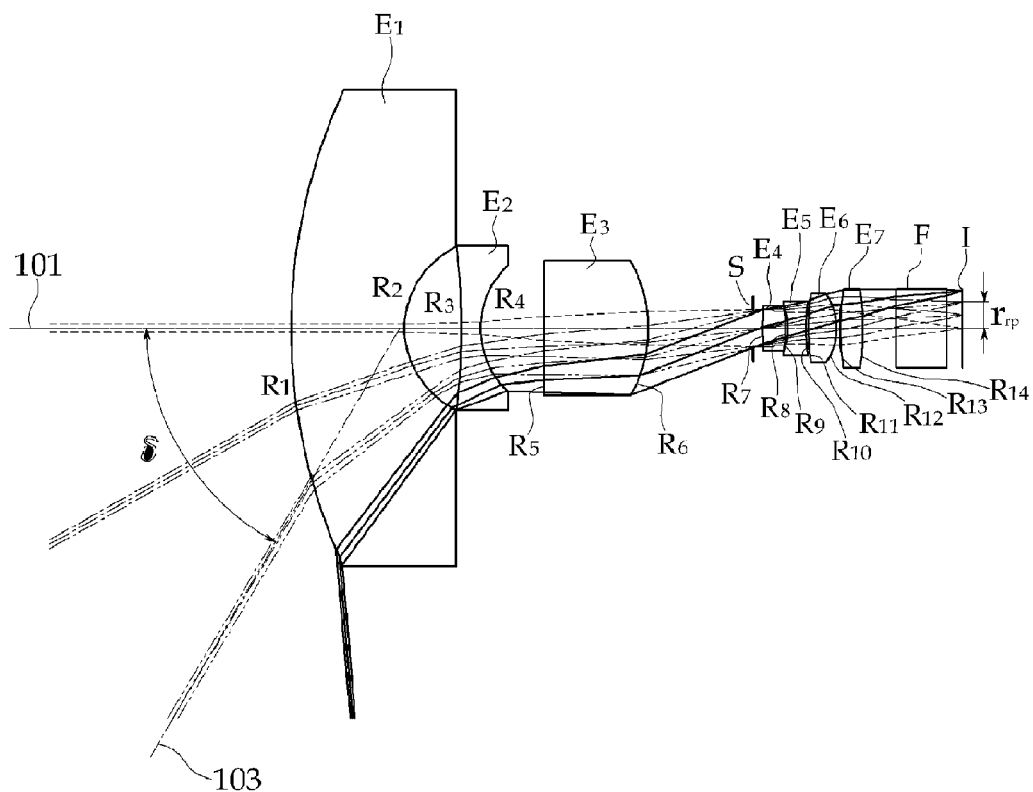
[Fig. 2]
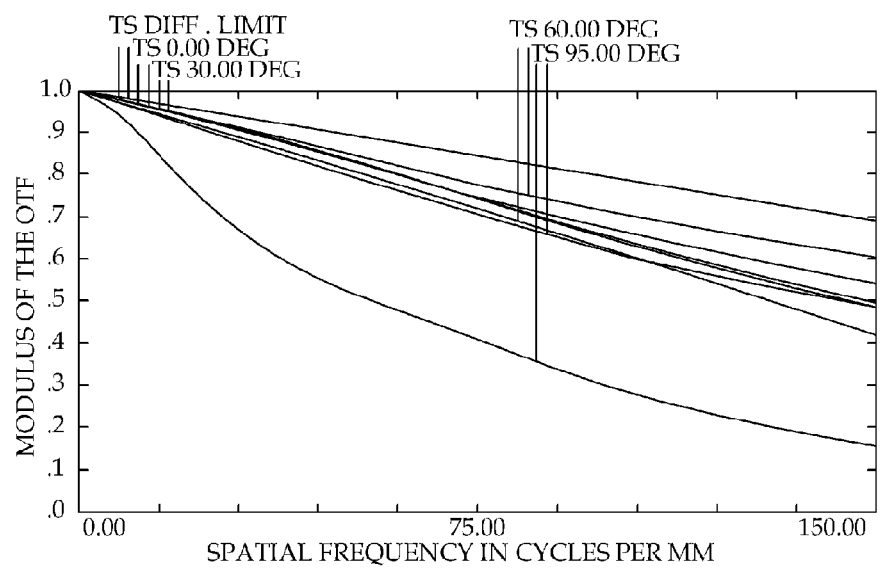

[Fig. 3]
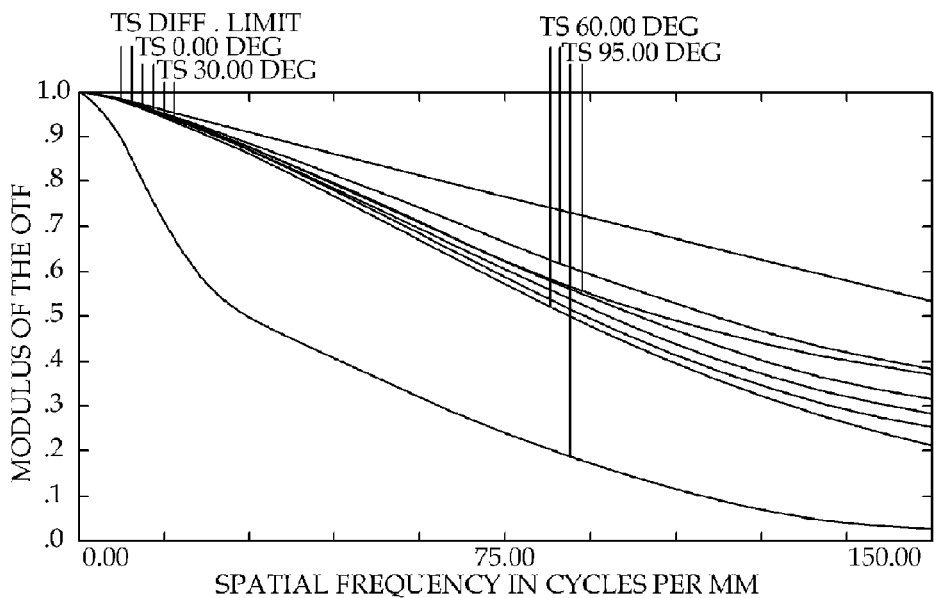
[Fig. 4]
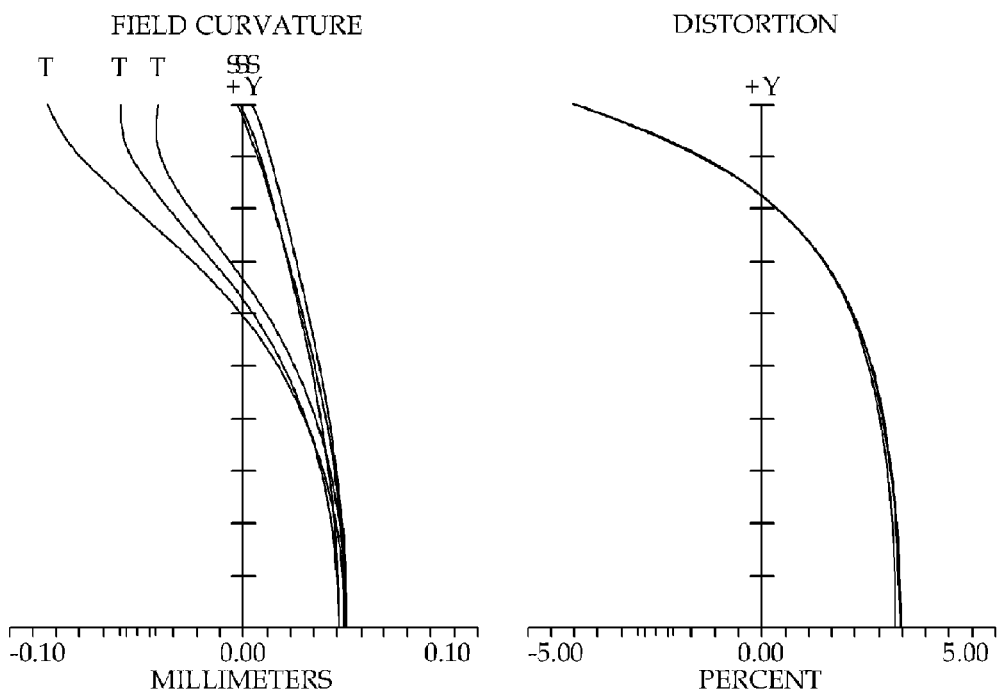

[Fig. 5]
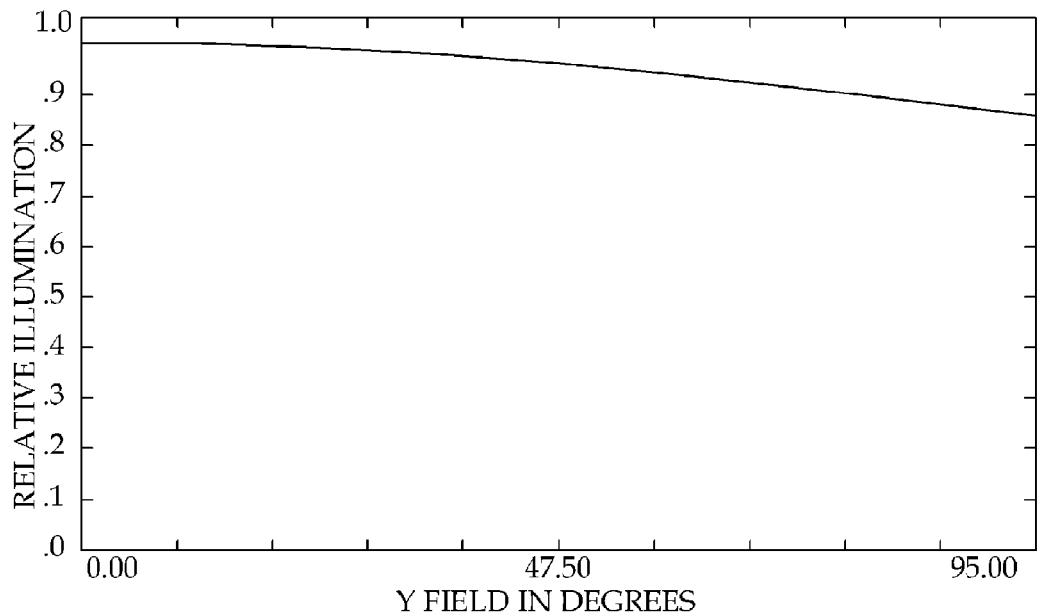
[Fig. 6]
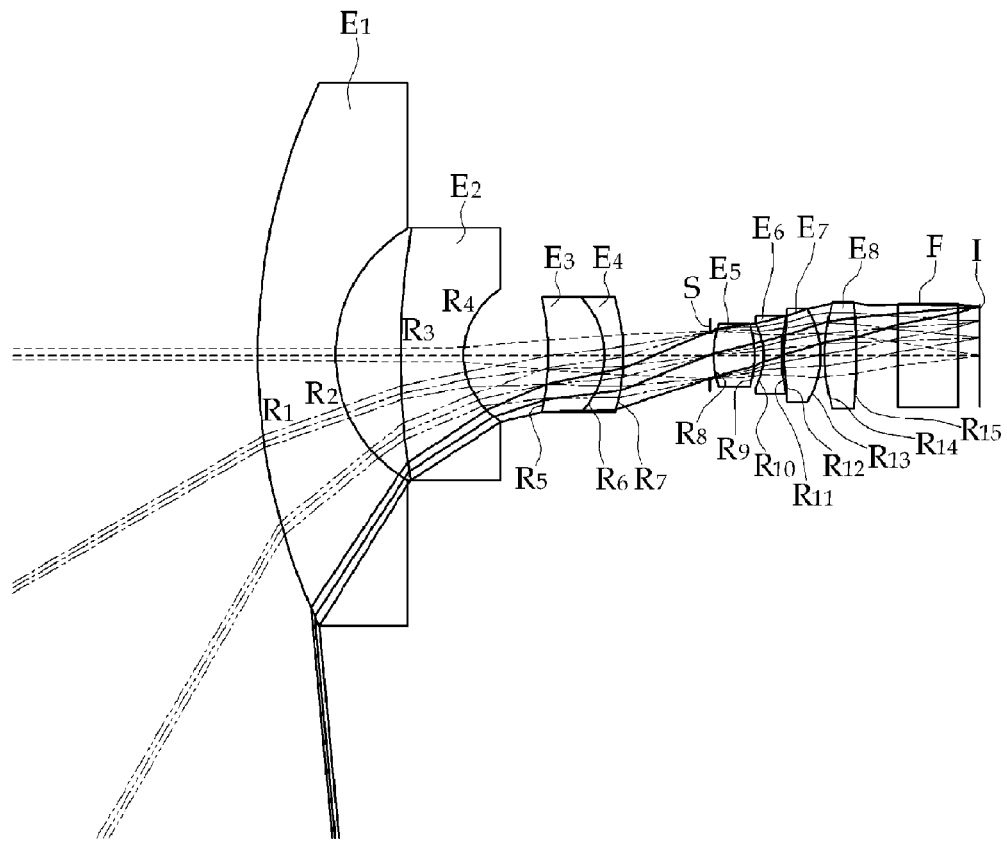

[Fig. 7]
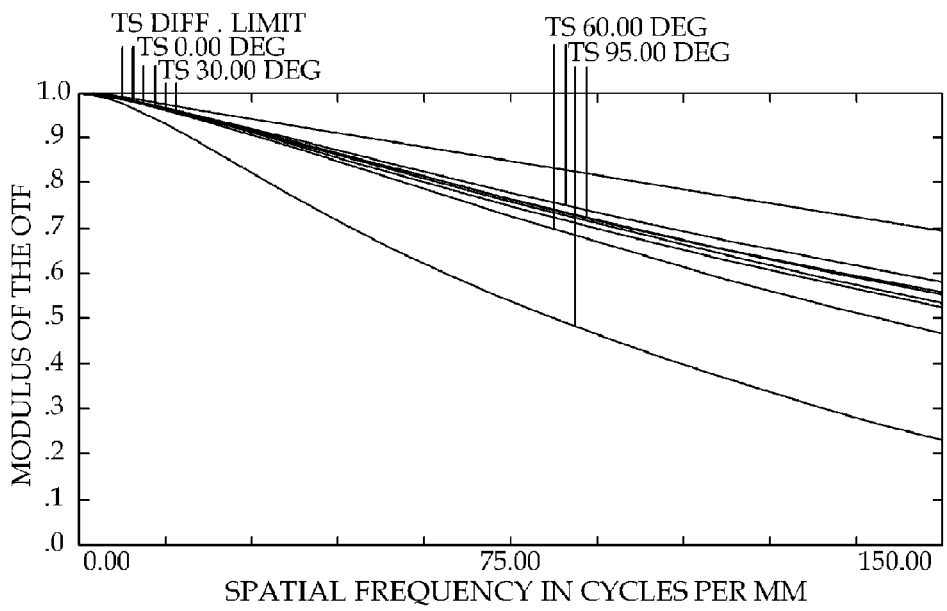
[Fig. 8]
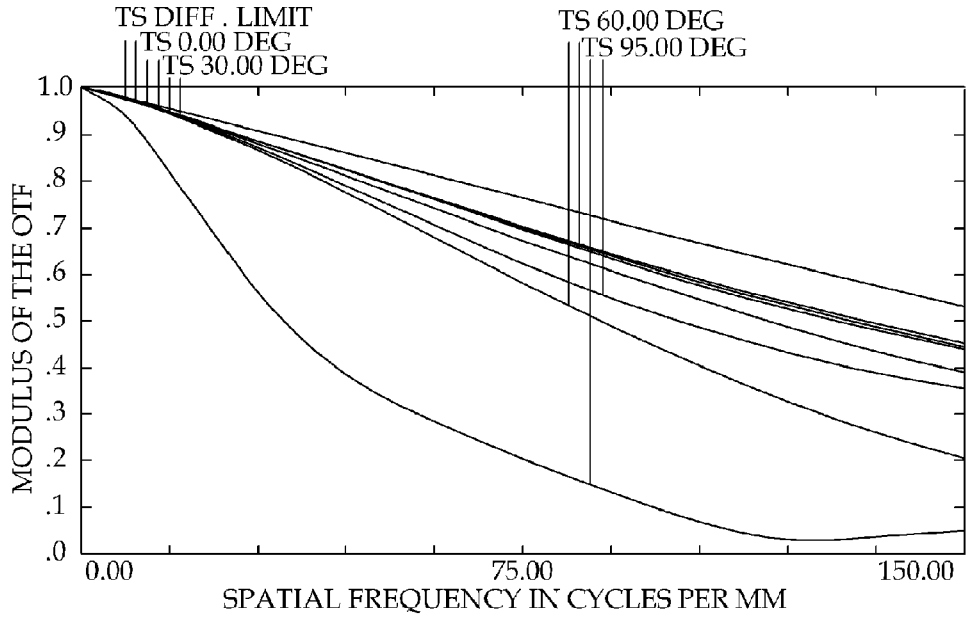

[Fig. 9]
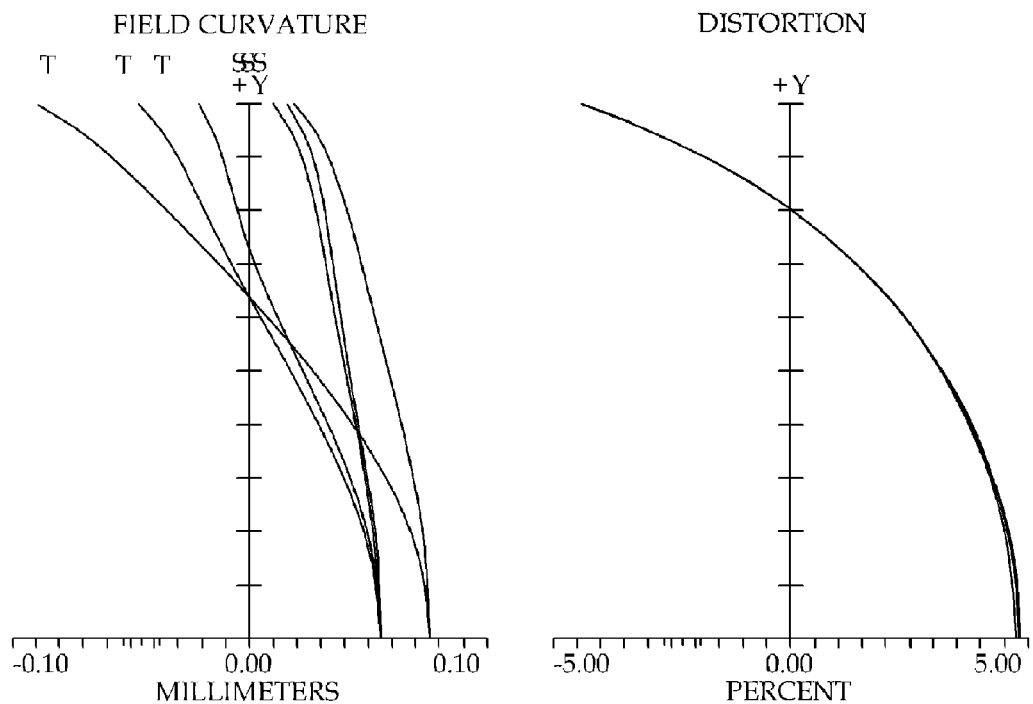
[Fig. 10]
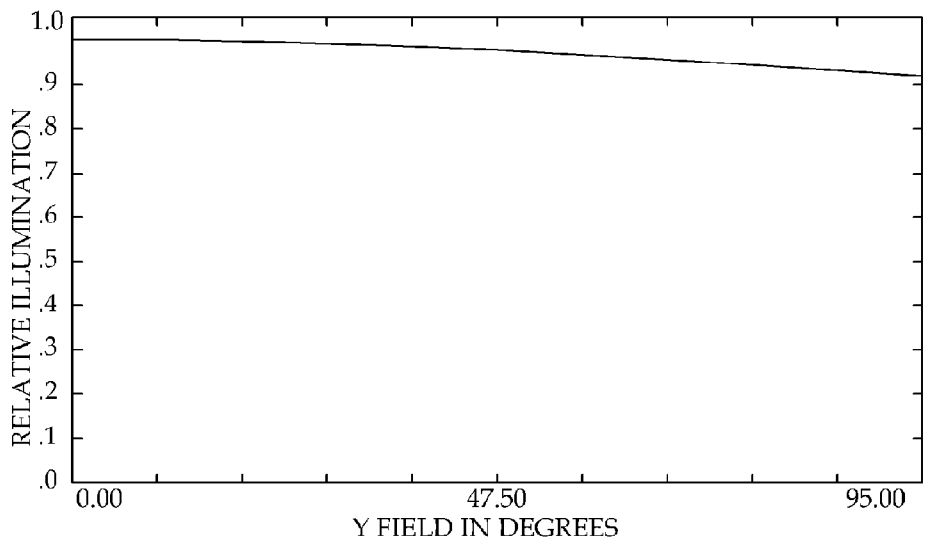

FISHEYE LENS

TECHNICAL FIELD

The present invention relates to a fisheye lens. More particularly, the present invention relates to a fisheye lens with Field of View that is larger than 180 degrees, and has high resolution both in the visible and the near infrared wavelengths, and follows an equidistance projection scheme.

BACKGROUND ART

A fisheye lens generally refers to a lens where the Field of View (FOV) is 160° or more, and the incidence angle of an incident ray is approximately proportional to the image height on the image plane. There are many application examples where a fisheye lens with FOV of 180° or more is required such as security-surveillance and entertainment. However, fisheye lenses of prior arts often contain more than 10 pieces of lens elements to achieve 180° or more FOV, or the fisheye lenses were very difficult to manufacture because the shape of some of the lens surfaces of lens elements are close to hemispherical surfaces. Also, some lenses use relatively small number of lens elements between 6 and 8. However, the modulation transfer function characteristics are not good, and consequently the lenses do not have enough resolution to obtain sharp images. Also, optical glasses with high refractive indexes are often used to keep the number of lens elements small, and the production cost arises as the result.

Other point of consideration is about projection schemes. Desirable projection schemes of a fisheye lens include an equidistance projection scheme. In an equidistance projection scheme, the incidence angle $\delta$ of an incident ray, the effective focal length f of the fisheye lens, and the image height $r_{ed}$ on the image plane satisfy a proportionality relation given in Eq. 1.

$$r_{ed}(\delta) = f\delta \quad \text{[math figure 1]}$$

Real projection scheme of a lens shows certain amount of deviation from the theoretical projection scheme given in Eq. 1. Although the real projection scheme of a lens can be experimentally measured, it can be theoretically predicted using dedicated lens design software once given the complete lens prescription. For example, image height in the y-axis direction for an incident ray having a given incident angle can be obtained using 'Reay' perator in 'Zemax' which is dedicated lens design software. Similarly, image height in the x-axis direction can be obtained using 'Reax' operator. If the real image height on the image plane for a lens is given as $r_{rp}$, then the error between the real projection scheme of a lens and an ideal equidistance projection scheme can be calculated as in Eq. 2.

$$\text{distortion}(\delta) = \frac{r_{ed}(\delta) - r_{rp}(\delta)}{r_{ed}(\delta)} \times 100\% \quad \text{[math figure 2]}$$

The distortion of a fisheye lens is generally measured as an f-θ distortion given in Eq. 2, and a high-end fisheye lens faithfully follows the equidistance projection scheme given in Eq. 1. It is relatively easy to design a fisheye lens simply having a FOV of 180° or more, but it is considerably more difficult to design a lens that has a FOV of 180° or more and the discrepancy from an equidistance projection scheme is less than 10%.

However, what is important in the industrial use of a fisheye lens is the fact that the incidence angle of an incident ray is proportional to the image height on the image plane, and it is not necessary that the proportionality constant is the effective focal length. Therefore, calibrated distortion, which involves a fictitious focal length $f_c$ that minimizes the f-θ distortion given by Eq. 2 over the entire range of incidence angle, is often used as a measure of lens performance. Here, the fictitious focal length $f_c$ is not related to the actual effective focal length of the lens, and given as an optimum fitting constant by least square error method. In other words, calibrated distortion indicates how close is the functional relation between the incidence angle of an incident ray and the image height on the image plane to a first order equation passing through the origin given by Eq. 1.

Another point of consideration is to secure enough back focal length while keeping the overall length of the lens short. Furthermore, another difficulty is to keep the relative illumination difference between the center and the periphery of the image plane small. If the relative illumination differs greatly, then brightness at the center and at the periphery of the image plane is significantly different.

Even though all these requirements are satisfied, still it is difficult to obtain a design that has enough manufacturing tolerance so that neither fabrication is too difficult nor production cost is overly excessive.

To take a specific example, reference 1 discloses a fisheye lens with 262° FOV.

However, since this is a dark lens with F-number of 14.94, it cannot be used unless the surrounding is brightly lit. Reference 2 discloses a fisheye lens with 170.8° FOV. However, this is also a dark lens with F-number of 7.98. Further, the lens structure makes this lens difficult to be mass produced because the shape of the second lens surface of the first lens element is nearly hemi-spherical. Reference 3 discloses fisheye lenses with 220° and 270° FOV. These lenses are relatively dark with F-number of 5.6, the shapes of the second lens surfaces of the first lens elements are nearly hemispherical, and modulation transfer function characteristics are not good enough to obtain high-resolution images. Reference 4 discloses a fisheye lens with F-number of 2.8 and 180° FOV. Although this lens has relatively high resolution, the calibrated distortion is higher than 15%, and consequently distortion is severe. Reference 5 discloses a fisheye lens with F-number of 2.8, and 220° FOV. However, the shape of the second lens surface of the first lens element is also close to hemi-spherical surface, and modulation transfer function characteristic is not sufficiently good. Reference 6 discloses a fisheye lens for projector with F-number of 2.4, and 163° FOV. However, relative illumination at the maximum incidence angle is low around 60%. Reference 7 provides a remarkable infrared fisheye lens with F-number of 0.7 and 270° FOV. Still, the number of lens element is only 4. Such an astonishing characteristic is partly due to the high refractive index of Germanium that is employed as the lens material in the infrared wavelength region. However, the shape of the second lens surface of the first lens element is hyper-hemispherical, and it is very difficult to be mass produced. Reference 8 concisely summarizes characteristic features of various commercial fisheye lenses. For most of the fisheye lenses, however, it can be seen that relative illuminations at the maximum incidence angles are 60% or less, and calibrated distortions are high, typically 10% or more. Reference 9 discloses an extraordinary fisheye lens with F-number of 2.0, and 180° FOV, and still using only 6 pieces of lens elements. However, this fisheye lens uses ultra high refractive index glass with a refractive index of 1.91, and consequently production cost is high. Furthermore, modulation transfer function characteristic is not sufficiently good. Reference 10 discloses a fisheye lens with F-number of 2.8 and 182° FOV, and following a projection scheme described by a special functional relation. However, this lens employs 11 pieces of lens elements, and therefore structure is complicated and production cost is high. Furthermore, modulation transfer function characteristic is not sufficiently good. Reference 11 discloses a fisheye lens with F-number of 2.8, and 180° FOV. This lens also uses only 6 pieces of lens elements, but production cost is high because aspherical lens element is used. Furthermore, modulation transfer function characteristic is not sufficiently good, and relative illumination at the maximum field angle is relatively low around 70%. On the other hand, reference 12 provides various embodiments of wide-angle lenses satisfying desirable projection schemes which can be implemented by wide-angle lenses.

[Reference 1] A. C. S. van Heel, G. J. Beernink, and H. J. Raterink, "Wide-angle objective lens", U.S. Pat. No. 2,947,219, date of registration Aug. 2, 1960.

[Reference 2] K. Miyamoto, "Fish eye lens", J. Opt. Soc. Am., vol. 54, pp. 1060-1061 (1964).

[Reference 3] M. Isshiki and K. Matsuki, "Achromatic super wide-angle lens", U.S. Pat. No. 3,524,697, date of registration Aug. 18, 1970.

[Reference 4] T. Ogura, "Wide-angle lens system with corrected lateral aberration", U.S. Pat. No. 3,589,798, date of registration Jun. 29, 1971.

[Reference 5] Y. Shimizu, "Wide-angle fisheye lens", U.S. Pat. No. 3,737,214, date of registration Sep. 29, 1971.

[Reference 6] R. Doshi, "Fisheye projection lens for large format film", Proc. SPIE, vol. 2000, pp. 53-61 (1993).

[Reference 7] J. B. Caldwell, "Fast IR fisheye lens with hyper-hemispherical field of view", Optics & Photonics News, p. 47 (July, 1999).

[Reference 8] J. J. Kumler and M. Bauer, "Fisheye lens designs and their relative performance", Proc. SPIE, vol. 4093, pp. 360-369 (2000).

[Reference 9] A. Ning, "Compact fisheye objective lens", U.S. Pat. No. 7,023,628, date of registration Apr. 4, 2006.

[Reference 10] K. Yasuhiro and Y. Kazuyoshi, "Fisheye lens and photographing apparatus with the same", Japanese patent publication no. 2006-098942, date of publication Apr. 13, 2006.

[Reference H] M. Kawada, "Fisheye lens unit", U.S. Pat. No. 7,283,312, date of registration Oct. 16, 2007.

[Reference 12] G. Kweon, and M. Laikin, "Wide-angle lens", Korean patent application no. 10-2007-0106725, date of application Oct. 23, 2007.

DISCLOSURE OF INVENTION

Technical Problem

The purpose of the present invention is to provide fisheye lenses with Field of Views greater than 180° and following equidistance projection schemes despite relatively small number of lens elements, and have mechanical structures suitable for mass production with low cost, replacing fisheye lenses of prior arts that either have mechanical structures that are difficult to be produced or have tight tolerances making commercial mass production difficult.

Technical Solution

In order to accomplish the above object, specific exemplary fisheye lenses are provided, whereof the number of lens elements is 7 or 8, and have desirable optical and mechanical characteristics.

Advantageous Effects

By providing fisheye lenses having desirable optical and mechanical properties, these lenses can be widely used in various application examples such as security-surveillance and entertainment.

BRIEF DESCRIPTION OF DRAWINGS

FIG. 1 is a diagram showing the optical layout and ray trajectories for a fisheye lens according to the first embodiment of the present invention.

FIG. 2 is a graph showing the modulation transfer function characteristic in the visible wavelength range for a fisheye lens according to the first embodiment of the present invention.

FIG. 3 is a graph showing the modulation transfer function characteristic in the near infrared wavelength range for a fisheye lens according to the first embodiment of the present invention.

FIG. 4 is a graph showing the field curvature and the calibrated distortion for a fisheye lens according to the first embodiment of the present invention.

FIG. 5 is a graph showing the relative illumination for a fisheye lens according to the first embodiment of the present invention.

FIG. 6 is a diagram showing the optical layout and ray trajectories for a fisheye lens according to the second embodiment of the present invention.

FIG. 7 is a graph showing the modulation transfer function characteristic in the visible wavelength range for a fisheye lens according to the second embodiment of the present invention.

FIG. 8 is a graph showing the modulation transfer function characteristic in the near infrared wavelength range for a fisheye lens according to the second embodiment of the present invention.

FIG. 9 is a graph showing the field curvature and the calibrated distortion for a fisheye lens according to the second embodiment of the present invention.

FIG. 10 is a graph showing the relative illumination for a fisheye lens according to the second embodiment of the present invention.

MODE FOR THE INVENTION

Hereinafter, preferred embodiments of the present invention will be described in detail with reference to FIG. 1 to FIG. 10.

First Embodiment

FIG. 1 shows the shape of the fisheye lens according to the first embodiment of the present invention and the ray trajectories. This lens is designed to work simultaneously in the visible and the near infrared wavelength ranges, and designed for a ⅓-inch CCD sensor with F-number of 2.8 and Field of view (FOV) of 190°. The lateral dimension of a ⅓-inch CCD sensor is 4.8 mm, the longitudinal dimension is 3.6 mm, and the diagonal dimension is 6.0 mm. In order to obtain a horizontal FOV of 180° or more from a camera using such an image sensor, the lens design is optimized so that the image height for an incidence angle of 90° is 2.35 mm.

This lens is comprised of the first lens element $E_1$ through the seventh lens element $E_7$, and the first through the seventh lens elements ($E_1$~$E_7$) are all refractive lens elements with both lens surfaces being spherical surfaces. A stop S is located between the third lens element $E_3$ and the fourth lens element $E_4$. The optical low pass filter F located between the seventh lens element $E_7$ and the image plane I is not a constituent element of the lens, but a part of the camera body that is covered over the image sensor plane of the camera. The role of the optical low pass filter is to remove moir effect from the image. FIG. 1 shows that this lens has been designed with the optical low pass filter taken into account.

An incident ray 103 originating from an object point on the object side has an incidence angle δ with respect to the optical axis 101 of the lens. This incident ray enters into the first lens surface $R_1$, which is a refractive surface of the first lens element $E_1$, and sequentially passes the first through the seventh lens elements and the optical low pass filter F, and finally converges toward the image plane I.

As has been stated previously, the first through the seventh lens elements are all refractive lens elements, and each lens element has two lens surfaces. For example, the first lens element has the first lens surface $R_1$ on the object side and the second lens surface $R_2$ on the image side, and the second lens element has the third lens surface $R_3$ on the object side and the fourth lens surface $R_4$ on the image side, and the rest of the lens elements have lens surfaces ranging from the fifth lens surface through the fourteenth lens surface. Table 1 provides a complete optical prescription of the fisheye lens according to the first embodiment of the present invention. The unit of radius and surface thickness in table 1 is millimeter.

with the first lens surface lies on the right side (i.e., image side) with respect to the first lens surface. Therefore, the direction from the center of this circle to the vertex of the first lens surface hereinafter referred to as the direction vector of the first lens surface is a direction pointing from the image side toward the object side. Here, a vertex refers to the intersection point between a lens surface and the optical axis. Furthermore, the radius of the second lens surface is 5.801 mm, and the center of a circle coinciding with the second lens surface also lies at the right side of the second lens surface. Therefore, the direction vector of the second lens surface also points from the image side toward the object side. Like this, when the direction vector of a lens surface on the object side of a lens element coincides with the direction vector of a lens surface on the image side of the same lens element, such a lens element is referred to as a meniscus lens element.

On the other hand, since the radius of the first lens surface is 36.793 mm and the radius of the second lens surface is 5.801 mm, the thickness of the first lens element measured parallel to the optical axis is thicker at the periphery than at the center. Therefore, the first lens element is a lens element having a negative refractive power. Considering all these points, the first lens element is a negative meniscus lens element having a convex surface facing the object side.

On the other hand, the second lens element has the third and the fourth lens surfaces, where the third lens surface is a concave surface facing the object side, and the fourth lens surface is a concave surface facing the image side. Therefore, the direction vector of the third lens surface and the direction vector of the fourth lens surface face to each other. Such a lens element is referred to as a bi-concave lens element. Bi-concave lens element always has a negative refractive power.

The third lens element has the fifth and the sixth lens surfaces, where the fifth and the sixth lens surfaces are all

TABLE 1

| Surface number | element | surface | radius | thickness | index | Abbe number | glass |
|---|---|---|---|---|---|---|---|
| object | | | infinity | infinity | | | |
| 1 | $E_1$ | $R_1$ | 36.793 | 6.806 | 1.8346 | 42.72 | E-LASF05 |
| 2 | | $R_2$ | 5.801 | 3.260 | | | |
| 3 | $E_2$ | $R_3$ | −52.565 | 1.196 | 1.8346 | 42.72 | E-LASF05 |
| 4 | | $R_4$ | 5.511 | 3.743 | | | |
| 5 | $E_3$ | $R_5$ | −151.239 | 6.159 | 1.7845 | 25.68 | E-SF11 |
| 6 | | $R_6$ | −9.068 | 6.657 | | | |
| 7 | S | | infinity | 0.200 | | | |
| 8 | $E_4$ | $R_7$ | 6.509 | 1.387 | 1.5813 | 40.74 | E-LF5 |
| 9 | | $R_8$ | −4.943 | 0.185 | | | |
| 10 | $E_5$ | $R_9$ | −3.771 | 0.987 | 1.8049 | 25.43 | E-SF6 |
| 11 | | $R_{10}$ | 7.223 | 0.193 | | | |
| 12 | $E_6$ | $R_{11}$ | 15.973 | 1.686 | 1.6179 | 63.37 | E-PSK02 |
| 13 | | $R_{12}$ | −3.940 | 0.197 | | | |
| 14 | $E_7$ | $R_{13}$ | 12.913 | 1.368 | 1.6179 | 63.37 | E-PSK02 |
| 15 | | $R_{14}$ | −17.252 | 1.981 | | | |
| 16 | F | | infinity | 3.000 | 1.5167 | 64.10 | E-BK7 |
| 17 | | | infinity | 1.000 | | | |
| 18 | I | | infinity | | | | |

Referring to FIG. 1 and table 1, the first lens element $E_1$ of the fisheye lens according to the first embodiment of the present invention is a negative meniscus lens element having a convex surface facing the object side. In other words, the first lens surface $R_1$ of the first lens element is a convex surface facing the object side, and the second lens surface $R_2$ is a concave surface facing the image side. Or, the first lens surface $R_1$ of the first lens element is a concave surface facing the image side, and the second lens surface $R_2$ is a convex surface facing the object side. The radius of the first lens surface is 36.793 mm, and the center of a circle coinciding convex surfaces facing the image side. Furthermore, since the third lens element is thicker near the optical axis than at the periphery, it has a positive refractive power. Therefore, the third lens element is a positive meniscus lens element having a convex surface lacing the image side.

As has been stated previously, a stop S is located between the third lens element and the fourth lens element.

The fourth lens element has the seventh and the eighth lens surfaces, where the seventh lens surface is a convex surface facing the object side, and the eighth lens surface is a convex surface facing the image side. Such a lens element is referred to as a bi-convex lens element. Bi-convex lens element always has a positive refractive power. Similarly, the fifth lens element is a bi-concave lens element, and the sixth and the seventh lens elements are bi-convex lens elements.

The lens prescriptions such as glass compositions and thickness are given in table 1, and all the optical glasses are chosen among the Hikari glasses. For example, the first lens element $E_1$ is made of high refractive index glass with a refractive index of 1.8346 and an Abbe number of 42.72. The optical glass from Hikari Glass Corporation having optical characteristics close to such refractive index and Abbe number has a commercial name given as E-LASF05. It has been assumed that the second through the seventh lens elements are made of optical glasses from Hikari Glass Corporation. However, such a design can be easily modified for products from other companies such as Schott and Hoya.

In this embodiment, both the first and the second lens elements have negative refractive powers, and the refractive indexes of the employed optical glasses are over 1.7, and the Abbe numbers are over 40. Such high refractive indexes are required in order to keep the shape of the lens surfaces approaching hemi-spherical surfaces, and relatively high Abbe numbers are required in order to reduce difference between different wavelengths. Furthermore, the first lens element is a negative meniscus lens element with a convex surface facing the object side, and the second lens element is a bi-concave lens element.

On the other hand, the refractive index of the third lens element is 1.7 or more, and the Abbe number is 30 or less. Such a low Abbe number is required in order to compensate for the difference in refractive powers of the first and the second lens elements as a function of wavelength.

FIG. 2 shows the modulation transfer function characteristic of the fisheye lens shown in FIG. 1 in the visible wavelength range, and it can be seen that resolution is 0.3 or more at 100 line pairs/millimeter. On the other hand, FIG. 3 shows the modulation transfer function characteristic of the fisheye lens in FIG. 1 in the near infrared wavelength range (0.85/ M~0.94/M), and it can be seen that resolution is fair as 0.2 or more at 100 line pairs/millimeter. In other words, this lens has sufficient resolution simultaneously in the visible and the near infrared wavelength ranges, and is qualified to be used in day & night security camera.

Left graph in FIG. 4 shows the field curvature of the fisheye lens according to the first embodiment of the present invention in the visible wavelength range, and the right graph shows the calibrated distortion. From the graph, it can be seen that calibrated distortion is around 4%, which is far less than 10%. In other words, this lens fairly faithfully implements an equidistance projection scheme. Although FIG. 4 shows characteristics in the visible wavelength range, characteristics in the near infrared wavelength range shows similar tendencies.

FIG. 5 shows the relative illumination in the visible wavelength range for the fisheye lens according to the first embodiment of the present invention, and it can be seen than relative illumination is 0.8 or more. For a wide-angle lens, relative illumination of 0.6 or more is considered fair. The FOV of this lens is 190° and the relative illumination is still 0.8 or more, a figure that can be considered as very good.

The overall length of a lens, which is another major characteristic of a lens, refers a length from the vertex of the first lens surface to the image plane I. This fisheye lens is a relatively small lens with an overall length of 40 mm. Furthermore, it has a sufficient back focal length, and therefore this lens can be used in industry without any inconvenience.

Finally, the most important feature of this lens is the fact that manufacturing tolerance is good. The lens of the first embodiment of the present invention has seven lens elements, and total of fourteen lens surfaces. Furthermore, to maintain precise intervals between the lens elements as given in table 1, multitude of spacers and barrel are used. Such lens elements and spacers need to be mechanically fabricated, and it is impossible to manufacture them according to the blueprint without any error. In other words, certain amount of error is inevitable. Since table 1 is a blueprint optimized for given features of a lens, degradation in characteristics follows when errors exist with this blueprint. However, depending on lens prescription, limits on fabrication errors causing a given amount of characteristics degradation differ significantly. Good design results in minor degradation in characteristics for relatively large fabrication errors.

Although state of the art fabrication tolerances achievable by current production technology differ depending on particular lens makers, ordinary fabrication tolerances nearly agree among them. For example, a thickness tolerance is 20/M, and a radius tolerance for lens surface is 3 fringes in Newton ring, and etc. If degradation in quality is not severe even if the lens is manufactured with these standard tolerances, then the lens can be produced at a low cost. On the other hand, if the lens has to be produced with tighter tolerances than ordinary tolerances in order to prevent degradation in quality or to reduce the number of defective products, then production can be difficult or impossible, and even if it is possible, the production cost can be very high and mass production can be very difficult. Therefore, even if it has all the desirable optical and mechanical characteristics, a design with not enough fabrication tolerances cannot be referred to as a good design.

The first embodiment of the present invention is a good design where the defective rate can be maintained in a usual level even if it is produced with ordinary fabrication tolerances. Such fabrication tolerances can be analyzed with a procedure called 'tolerance analysis' and can be easily confirmed with dedicated lens design software such as Code V or Zemax provided a complete lens prescription is available.

Second Embodiment

FIG. 6 shows the shape of the fisheye lens according to the second embodiment of the present invention and the ray trajectories. This lens is also designed to work simultaneously in the visible and the near infrared wavelength ranges, and designed for a ⅓-inch CCD sensor with F-number of 2.8 and Field of view (FOV) of 190°.

This lens is comprised of the first lens element $E_1$ through the eighth lens element $E_8$, and the first through the eighth lens elements ($E_1$~$E_8$) are all refractive lens elements with both lens surfaces being spherical surfaces. A stop S is located between the fourth lens element $E_4$ and the fifth lens element $E_5$. An optical low pass filter F is located between the eighth lens element $E_8$ and the image plane I. FIG. 6 shows that this lens has been designed with the optical low pass filter taken into account.

An incident ray originating from an object point on the object side has an incidence angle δ with respect to the optical axis of the lens. This incident ray enters into the first lens surface $R_1$, which is a refractive surface of the first lens element $E_1$, and se-i i quentially passes the first through the eighth lens elements and the optical low pass filter F, and finally converges toward the image plane I. The third lens element $E_3$ and the fourth lens element E 4 constitute a cemented doublet.

As has been stated previously, the first through the eighth lens elements are all refractive lens elements, and each lens element has two lens surfaces. For example, the first lens element has the first lens surface $R_1$ on the object side and the second lens surface $R_2$ on the image side, and the second lens element has the third lens surface $R_3$ on the object side and the fourth lens surface $R_4$ on the image side, and the rest of the 4 lens elements have lens surfaces ranging from the fifth lens surface through the fifteenth lens surface. The third lens element $E_3$ and the fourth lens element $E_4$ share 3 4 the sixth lens surface $R_6$. Table 2 provides complete lens prescription of the fisheye lens according to the second embodiment of the present invention.

TABLE 2

| Surface number | element | surface | radius | thickness | index | Abbe number | glass |
|---|---|---|---|---|---|---|---|
| object | | | infinity | infinity | | | |
| 1 | $E_1$ | $R_1$ | 29.794 | 3.801 | 1.7724 | 49.61 | E-LASF16 |
| 2 | | $R_2$ | 7.112 | 3.120 | | | |
| 3 | $E_2$ | $R_3$ | 37.956 | 3.089 | 1.7724 | 49.61 | E-LASF16 |
| 4 | | $R_4$ | 3.798 | 4.071 | | | |
| 5 | $E_3$ | $R_5$ | −13.824 | 2.725 | 1.7616 | 26.56 | E-SF14 |
| 6 | $E_3/E_4$ | $R_6$ | −3.990 | 0.911 | 1.6967 | 55.53 | E-LAK14 |
| 7 | $E_4$ | $R_7$ | −9.399 | 4.205 | | | |
| 8 | S | | infinity | 0.200 | | | |
| 9 | $E_5$ | $R_8$ | 5.358 | 2.011 | 1.5687 | 56.34 | E-BAK4 |
| 10 | | $R_9$ | −4.515 | 0.390 | | | |
| 11 | $E_6$ | $R_{10}$ | −3.527 | 0.842 | 1.8049 | 25.43 | E-SF6 |
| 12 | | $R_{11}$ | 7.737 | 0.169 | | | |
| 13 | $E_7$ | $R_{12}$ | 15.055 | 1.731 | 1.6203 | 60.29 | E-SK16 |
| 14 | | $R_{13}$ | −4.573 | 0.200 | | | |
| 15 | $E_8$ | $R_{14}$ | 8.965 | 1.539 | 1.6399 | 60.09 | E-LAK01 |
| 16 | | $R_{15}$ | −20.109 | 1.986 | | | |
| 17 | F | | infinity | 3.000 | 1.5167 | 64.10 | E-BK7 |
| 18 | | | infinity | 1.000 | | | |
| 19 | I | | infinity | | | | |

Referring to FIG. 6 and table 2, the first lens element $E_1$ and the second lens element $E_2$ of the fisheye lens according to the second embodiment of the present invention are all negative meniscus lens elements having convex surfaces lacing the object side.

The third lens element is a positive meniscus lens element having a convex surface facing the image side. In other words, the direction vector of the refractive surface of the third lens element on the objective side, namely the fifth lens surface, and the direction vector of the refractive surface on the image side, namely the sixth lens surface, all point from the object side to the image side. Furthermore, since the radius of the fifth lens surface is −13.824 mm, and the radius of the sixth lens surface is −3.990 mm, the thickness of the third lens element measured parallel to the optical axis is thicker at the center than at the periphery. Therefore, the third lens element is a lens element having a positive refractive power. Furthermore, the fourth lens element is a negative meniscus lens element having a convex surface lacing the image side. As has been stated previously, the third lens element and the fourth lens element constitute a cemented doublet, and share the sixth lens surface. A stop S is located between the fourth lens element and the fifth lens element.

Similarly, the fifth lens element is a bi-convex lens element, the sixth lens element is a bi-concave lens element, and the seventh and the eighth lens elements are bi-convex lens elements.

The lens prescription such as glass compositions and thickness of the spherical lens elements are given in table 2, and all the optical glasses are chosen among the Hikari glasses.

In this embodiment, both the first and the second lens elements have negative refractive powers. Specifically, they are negative meniscus lens elements with convex surfaces lacing the object side. The refractive indices of the employed optical glasses are 1.7 or more, and the Abbe numbers are 40 or more.

On the other hand, the refractive index of the third lens element is 1.7 or more, and the Abbe number is 30 or less. Such a relatively low Abbe number is required in order to compensate for the difference in refractive powers of the first and the second lens elements as a function of wavelength.

FIG. 7 shows the modulation transfer function characteristic of the fisheye lens shown in FIG. 6 in the visible wavelength range, and it can be seen that resolution is 0.3 or more at 100 line pairs/millimeter. On the other hand, FIG. 8 shows the modulation transfer function characteristic of the fisheye lens in FIG. 6 in the near infrared wavelength range (0.85/M~0.94/M), and it can be seen that resolution is fair as over 0.1 at 100 line pairs/millimeter. In other words, this lens has sufficient resolution simultaneously in the visible and the near infrared wavelength ranges, and is qualified to be used in day & night security camera.

Left graph in FIG. 9 shows the field curvature of the fisheye lens according to the second embodiment of the present invention in the visible wavelength range, and the right graph shows the calibrated distortion. From the graph, it can be seen that calibrated distortion is less than 5%, which is far less than 10%. In other words, this lens fairly faithfully implements an equidistance projection scheme. Although FIG. 9 shows characteristics in the visible wavelength range, characteristics in the near infrared wavelength range shows similar tendencies.

FIG. 10 shows the relative illumination in the visible wavelength range for the fisheye lens according to the second embodiment of the present invention, and it can be seen than relative illumination is quite fair, as it is 0.9 or more. Furthermore, the overall length of the lens is 35 mm, which makes the lens of this embodiment a fairly small one. Furthermore, it has a sufficient back focal length, and therefore this lens can be used in industry without any inconvenience. Finally, the fabrication tolerance, which is one of the most important features of a lens, amounts to ordinary fabrication tolerance, and therefore this lens is suitable for mass production.

Preferred embodiments of the current invention have been described in detail referring to the accompanied drawings. However, the detailed description and the embodiments of the current invention are purely for illustrate purpose, and it will be apparent to those skilled in the art that variations and modifications are possible without deviating from the spirits and the scopes of the present invention.

INDUSTRIAL APPLICABILITY

The fisheye lenses of the embodiments of the present invention have excellent optical characteristics and mechanical structures. Nevertheless, they have sufficient fabrication tolerances, and therefore they are suitable for mass production with low cost.

SEQUENCE LISTING fisheye lens, equidistance projection
The invention claimed is:
1. A fisheye lens comprised of a first through a seventh lens elements:
wherein;
a field of view is larger than 180°,
a calibrated distortion is 10% or less,
a relative illumination is 80% or more,
all the refractive surfaces of the lens elements are spherical surfaces,
the first lens element is a negative meniscus lens element having a convex surface facing an object side,
the second lens element is a bi-concave lens element,
the third lens element is a positive meniscus lens element having a convex surface facing an image side,
a stop is located between the third and the fourth lens elements, the fourth lens element is a bi-convex lens element,
the fifth lens element is a bi-concave lens element,
the sixth and the seventh lens elements are bi-convex lens elements.
2. The fisheye lens of claim 1:
Wherein;
refractive indexes of the first, the second, and the third lens elements are over 1.7 or more, Abbe numbers of the first and the second lens elements are 40 or more, an Abbe number of the third lens element is 30 or less.
3. The fisheye lens of claim 1:
wherein a prescription of the lens is given as the following table:

4. A fisheye lens comprised of a first through an eighth lens elements:
wherein;
a field of view is larger than 180°,
a calibrated distortion is 10% or less,
a relative illumination is 80% or more,
all the refractive surfaces of the lens elements are spherical surfaces,
the first and the second lens elements are negative meniscus lenses having convex surfaces facing an object side,
the third lens element and the fourth lens element constitute a cemented doublet,
the third lens element is a positive meniscus lens element having a convex surface facing an image side,
the fourth lens element is a negative meniscus lens element having a convex surface facing the image side,
a stop is located between the fourth and the fifth lens elements,
the fifth lens element is a bi-convex lens element,
the sixth lens element is a bi-concave lens element,
the seventh and the eighth lens elements are bi-convex lens elements.

5. The fisheye lens of claim 4:
Wherein;
refractive indexes of the first, the second, and the third lens elements are 1.7 or more,
Abbe numbers of the first and the second lens elements are 40 or more,
an Abbe number of the third lens element is 30 or less.

6. The fisheye lens of claim 4:
wherein a prescription of the lens is given as the following table:

| Surface number | element | surface | radius | thickness | index | Abbe number | glass |
|---|---|---|---|---|---|---|---|
| object | | | infinity | infinity | | | |
| 1 | $E_1$ | $R_1$ | 36.793 | 6.806 | 1.8346 | 42.72 | E-LASF05 |
| 2 | | $R_2$ | 5.801 | 3.260 | | | |
| 3 | $E_2$ | $R_3$ | −52.565 | 1.196 | 1.8346 | 42.72 | E-LASF05 |
| 4 | | $R_4$ | 5.511 | 3.743 | | | |
| 5 | $E_3$ | $R_5$ | −151.239 | 6.159 | 1.7845 | 25.68 | E-SF11 |
| 6 | | $R_6$ | −9.068 | 6.657 | | | |
| 7 | S | | infinity | 0.200 | | | |
| 8 | $E_4$ | $R_7$ | 6.509 | 1.387 | 1.5813 | 40.74 | E-LF5 |
| 9 | | $R_8$ | −4.943 | 0.185 | | | |
| 10 | $E_5$ | $R_9$ | −3.771 | 0.987 | 1.8049 | 25.43 | E-SF6 |
| 11 | | $R_{10}$ | 7.223 | 0.193 | | | |
| 12 | $E_6$ | $R_{11}$ | 15.973 | 1.686 | 1.6179 | 63.37 | E-PSK02 |
| 13 | | $R_{12}$ | −3.940 | 0.197 | | | |
| 14 | $E_7$ | $R_{13}$ | 12.913 | 1.368 | 1.6179 | 63.37 | E-PSK02 |
| 15 | | $R_{14}$ | −17.252 | 1.981 | | | |
| 16 | F | | infinity | 3.000 | 1.5167 | 64.10 | E-BK7 |
| 17 | | | infinity | 1.000 | | | |
| 18 | I | | infinity. | | | | |

| Surface number | element | surface | radius | thickness | index | Abbe number | glass |
|---|---|---|---|---|---|---|---|
| object | | | infinity | infinity | | | |
| 1 | $E_1$ | $R_1$ | 29.794 | 3.801 | 1.7724 | 49.61 | E-LASF16 |
| 2 | | $R_2$ | 7.112 | 3.120 | | | |
| 3 | $E_2$ | $R_3$ | 37.956 | 3.089 | 1.7724 | 49.61 | E-LASF16 |
| 4 | | $R_4$ | 3.798 | 4.071 | | | |
| 5 | $E_3$ | $R_5$ | −13.824 | 2.725 | 1.7616 | 26.56 | E-SF14 |
| 6 | $E_3/E_4$ | $R_6$ | −3.990 | 0.911 | 1.6967 | 55.53 | E-LAK14 |
| 7 | $E_4$ | $R_7$ | −9.399 | 4.205 | | | |
| 8 | S | | infinity | 0.200 | | | |
| 9 | $E_5$ | $R_8$ | 5.358 | 2.011 | 1.5687 | 56.34 | E-BAK4 |
| 10 | | $R_9$ | −4.515 | 0.390 | | | |
| 11 | $E_6$ | $R_{10}$ | −3.527 | 0.842 | 1.8049 | 25.43 | E-SF6 |
| 12 | | $R_{11}$ | 7.737 | 0.169 | | | |
| 13 | $E_7$ | $R_{12}$ | 15.055 | 1.731 | 1.6203 | 60.29 | E-SK16 |
| 14 | | $R_{13}$ | −4.573 | 0.200 | | | |
| 15 | $E_8$ | $R_{14}$ | 8.965 | 1.539 | 1.6399 | 60.09 | E-LAK01 |
| 16 | | $R_{15}$ | −20.109 | 1.986 | | | |
| 17 | F | | infinity | 3.000 | 1.5167 | 64.10 | E-BK7 |
| 18 | | | infinity | 1.000 | | | |
| 19 | I | | infinity. | | | | |

\* \* \* \* \*